April 21, 1964  T. F. HANSON  3,129,904
HELICOPTER TAIL BOOM AND TAIL ROTOR DRIVE SHAFT SUPPORTS
Filed Jan. 29, 1962
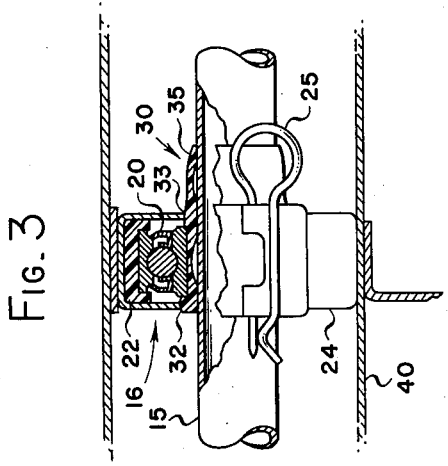
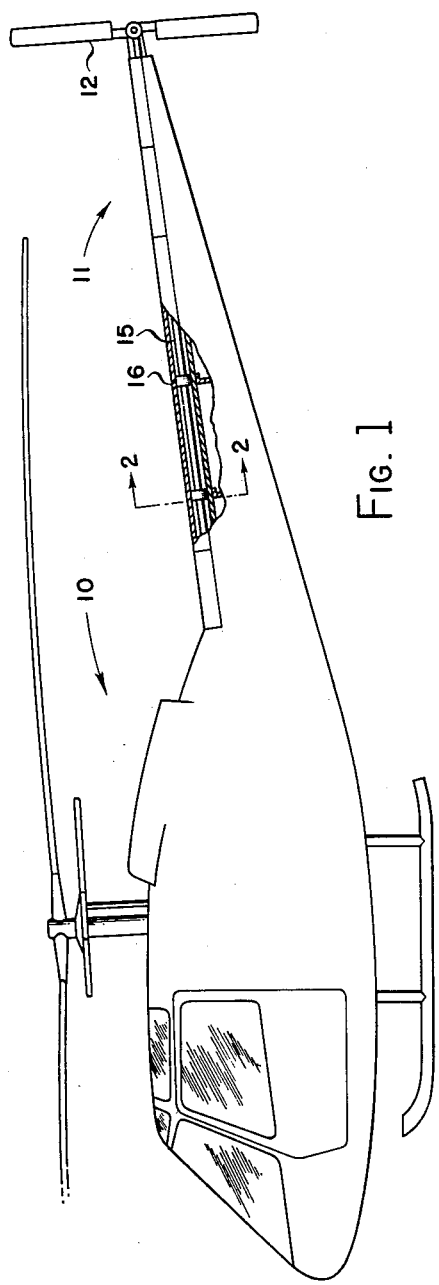
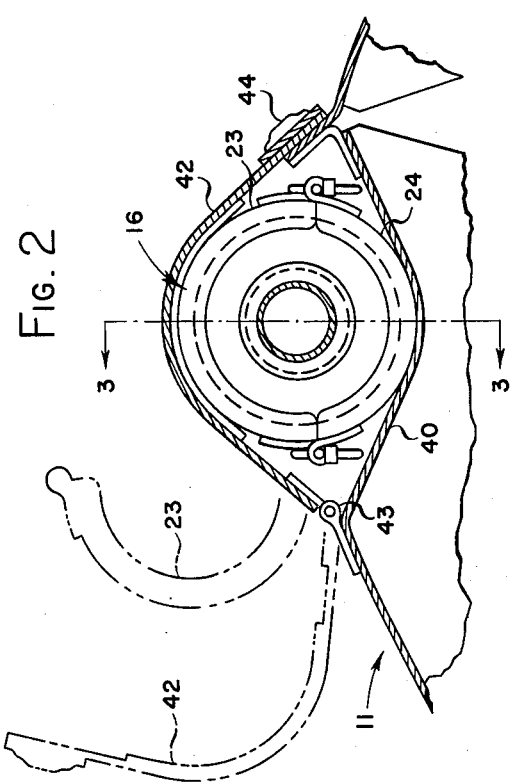
INVENTOR.
THOMAS F. HANSON
BY
*George C. Sullivan*
Agent

3,129,904
HELICOPTER TAIL BOOM AND TAIL ROTOR DRIVE SHAFT SUPPORTS
Thomas Francis Hanson, Chatsworth, Calif., assignor to Lockheed Aircraft Corporation, Burbank, Calif.
Filed Jan. 29, 1962, Ser. No. 169,542
3 Claims. (Cl. 244—17.19)

This invention pertains to a helicopter tail boom and tail rotor drive shaft with high speed shaft support bearings.

The rotary wing of a helicopter produces a great amount of torque around the vertical axis of the aircraft. To counteract this torque, a tail rotor has been commonly used which provides a moment in the opposite direction to that created by the main rotary wing. Since the moment created by the tail rotor is equal and opposite to that created by the torque of the main rotor the two are geared positively together. If the motive power for the main rotor fails, obviously the power to the tail rotor should also cease. Failure to do this would cause a torque problem in the opposite direction to that created by the main rotor.

In gearing the main rotor and the tail rotor together, the usual means is a rotating shaft. Since the tail rotor must be outside the main rotor disk such a shaft is very long. The shaft must also rotate at a high speed. Vibrations however slight result in great wear of the fast moving shaft. This means that bearing life normally is very short in a tail rotor drive shaft. The high speed rotation with vibration frequently puts such stress on the bearings that they finally freeze up. This freezing of the bearings can cause immediate failure or can lead to further abrasion and subsequent failure of the shaft and loss of yaw control.

It is thus an important object of this invention to provide a resilient bearing support for a helicopter tail rotor drive shaft which permits wide excursions laterally of the bearing to minimize the effects of vibration or bending of the shaft.

It is another important object of this invention to provide an inner support between the bearings and the rotating drive shaft of low friction material so that in event the bearing does freeze, the low friction material will provide an additional bearing surface and will decrease the chance of shaft failure.

It is another important object of this invention to provide a helicopter tail boom drive shaft cover to hold the resilient bearing support in place in the event of failure or inadvertent omission of the retainer lock means.

Further objects and advantages of the present invention will become apparent from the reading of the following figures and specification.

FIGURE 1 shows a helicopter with a tail boom in which the present invention is incorporated.

FIGURE 2 is a view taken on lines 2—2 of FIGURE 1.

FIGURE 3 is a view taken on lines 3—3 of FIGURE 2.

The helicopter 10 is shown with a tail boom 11 with a tail rotor drive shaft 15 running along its upper edge with appropriate differential means to drive the tail rotor 12 at the aft end. Because of the necessity of constructing a light weight vehicle for flight, tail boom 11 must be constructed of light weight materials. This type of structure is susceptible to vibration which leads to wear and failure.

There are a plurality of shaft support bearing assemblies 16 spaced along the longitudinal drive shaft 15. The shaft support bearing assembly can be seen more clearly in its particular relationship with the tail boom in FIGURES 2 and 3.

Bearing assembly 16 includes a ball bearing 20 having the usual inner and outer race with balls therebetween and a resilient annular bearing support 22 about the bearing 20 to permit lateral movement. Holding the ball bearing and the resilient annular bearing support 22 together is a split housing having an upper half 23 and a lower half 24 held together by lock pin 25 on the sides.

About the drive shaft 15 at each bearing is a molded inner support sleeve 30 of low friction material such as Teflon. The inner support sleeve 30 has a pair of shoulders 32, 33 spaced apart the width of the bearing assembly 16. A tongue 35 with a tapered end on the sleeve 30 is provided so that the bearing assembly may be slipped into the space between the shoulders 32 and 33 for ease of assembly. Shoulder 33 is provided with a small fillet.

It can be seen that assembly of the drive shaft and bearing combination is relatively simple. First the molded low friction material resilient inner support sleeve 30 is slipped over the end of the drive shaft down to the point at which a bearing is desired and then the bearing assembly is slipped over from the tongue 35 end into the space between shoulders 32 and 33 where it will be retained. The housing is then locked into place by lock pins 25. A plurality of these assemblies is spaced along the tail rotor drive shaft 15.

The housing containing the bearing assembly and molded sleeve rests upon the trough shaped member 40 extending the entire length of the tail boom near its top. A cover 42 is hinged along its edge with a piano type hinge 43. The cover 42 has fasteners 44 along its length to fasten it to the opposite side of the trough shaped member 40. When fastened, it bears against the bearing assembly 16 to retain it in place in case a lock pin 25 is inadvertently omitted.

The resilient annular inner support sleeve 22 surrounding the bearing 20 allows for lateral movement of the bearing so as to absorb any vibrations in the tail boom or any eccentricities in the rotor shaft itself without excessive bearing wear. If for any reason the bearing should wear and freeze so that it no longer provides an anti-friction means, the molded sleeve made of some anti-friction materials such as Teflon would provide a bearing surface on which the drive shaft 15 could rotate with small chance of failure due to abrasion from the bearing assembly itself. The bearing surface can be either the inside of the sleeve or the outside of the sleeve, between the shaft 15 and the sleeve, or between the sleeve and the bearing assembly 16 but in either event the wear on the drive shaft and the friction which the motive means must overcome will be minimum. Flight can be continued until repair can be made. Repair will probably consist of replacing a single bearing assembly and not the entire shaft as has been the case in many instances with present tail rotor drive shafts.

A helicopter tail boom and tail rotor drive shaft provided with fail safe anti-friction bearings has been shown. A high degree of reliability in the tail rotor drive system has been demonstrated as has ease of maintenance since the assembly is located near the top surface of the tail boom with a high degree of ease of access and assembly.

Having disclosed the details of my invention, I claim the following combinations and their equivalents:

1. In a helicopter, an improvement in the means for transmitting power from motive means in the body to a tail rotor in the tail boom, said improvement comprising:
    (a) a drive shaft extending from the motive means to the tail rotor along the upper portion of the tail boom;
    (b) a plurality of bearing assemblies on said shaft, each of said assemblies being adapted to fit on the shaft at any desired bearing point without reduction in shaft diameter and comprising:
- a sleeve of low friction material fitting on said shaft;
- an annular recessed portion on the exterior of said sleeve;
- an annular bearing member fitting into said recessed portion;
- a resilient collar around said bearing member; and
- a split housing member for retaining said collar and bearing on said sleeve;

(c) a trough-shaped member in the boom extending substantially the length of the shaft and supporting the bearing assemblies; and (d) a cover member co-extensive with the trough-shaped member and adapted to hold the bearing assemblies firmly against the trough-shaped member, said cover member being hinged to the boom and forming a portion of the upper surface thereof.

2. In a helicopter, an improvement in the means for transmitting power from motive means in the body to a tail rotor in the tail boom, said improvement comprising:

(a) a drive shaft extending from the motive means to the tail rotor;

(b) a plurality of bearing assemblies on said shaft, each of said assemblies being adapted to fit on the shaft at any desired bearing point without reduction in shaft diameter and comprising:
- a sleeve of low friction material fitting on said shaft;
- an annular recessed portion on the exterior of said sleeve;
- an annular bearing member fitting into said recessed portion;
- a resilient collar around said bearing; and
- a split housing member for retaining said collar and bearing on said sleeve; and (c) means for supporting said bearing assemblies in the tail boom.

3. A bearing assembly for use in supporting a relatively long drive shaft at spaced bearing points without reduction of the shaft diameter at such points, said assembly comprising:

(a) a sleeve of low friction material adapted to fit on said shaft at the desired bearing point;

(b) an annular recessed portion on the exterior of said sleeve;

(c) an annular bearing member fitting into said recessed portion;

(d) a resilient collar around said bearing; and (e) a split housing member for retaining said collar and bearing on said sleeve.

References Cited in the file of this patent

UNITED STATES PATENTS

| | | |
|---|---|---|
| 2,054,228 | Oelkers | Sept. 15, 1936 |
| 2,481,750 | Hiller | Sept. 13, 1949 |
| 2,530,467 | Hunt | Nov. 21, 1950 |
| 2,872,254 | McNaughton | Feb. 3, 1959 |
| 2,935,362 | Diener | May 3, 1960 |
| 3,022,127 | Vollmer | Feb. 20, 1962 |